United States Patent
Hwang

[19]

[11] Patent Number: 5,951,631
[45] Date of Patent: Sep. 14, 1999

[54] CARRY LOOKAHEAD ADDER

[75] Inventor: Beong Kwon Hwang, Kyoungki-do, Rep. of Korea

[73] Assignee: Hyundai Electronics Industries Co., Ltd., Ichon, Rep. of Korea

[21] Appl. No.: 08/999,259

[22] Filed: Dec. 29, 1997

[30] Foreign Application Priority Data

Dec. 30, 1996 [KR] Rep. of Korea ........................ 96-76668
Jun. 30, 1997 [KR] Rep. of Korea ........................ 97-29667

[51] Int. Cl.$^6$ ........................................................ G06F 7/50
[52] U.S. Cl. ............................ 708/710; 708/702; 708/704
[58] Field of Search ..................................... 708/710–713, 708/701–702, 704

[56] References Cited

U.S. PATENT DOCUMENTS

| | | | |
|---|---|---|---|
| 4,899,305 | 2/1990 | Needles | 708/710 |
| 4,962,471 | 10/1990 | Cornelissen . | |
| 5,434,810 | 7/1995 | Goto et al. | 708/710 |
| 5,500,813 | 3/1996 | Song et al. | 708/712 |
| 5,719,803 | 2/1998 | Naffziger | 708/710 |

*Primary Examiner*—Tan V. Mai
*Attorney, Agent, or Firm*—Jacobson, Price, Holman & Stern, PLLC

[57] ABSTRACT

A high-performance carry lookahead adder (CLA) which can reduce the delay time of the whole adder by constructing a carry generator used therein with NMOS logics, thereby effecting a high-speed operation of the adder along with a lower power-consumption. The carry generator receives an exclusive-OR value P(i, i=1,2,3,4) and a logic product value G(i) of two data, and an initial carry value C(1), and performs a function of G(4)+P(4)·G(3)+P(4)·P(3)·G(2)+P(4)·P(3)·P(2)·G(1)+P(4)·P(3)·P(2)·P(1)·C(1) to output a final carry value C(5). The carry generator includes a first NMOS transistor for executing an operation of P(4)·G(3), second and third NMOS transistors for executing an operation of P(4)·P(3)·G(2), fourth to sixth NMOS transistors for executing an operation of P(4)·P(3)·P(2)·G(1), seventh to eleventh NMOS transistors for executing an operation of P(4)·P(3)·P(2)·P(1)·C(1), and twelfth to fourteenth NMOS transistors for outputting the final carry signal C(5) by an OR operation of the respective logic product terms.

10 Claims, 8 Drawing Sheets

CARRY LOOKAHEAD ADDER

BACKGROUND OF THE INVENTION

1. Field of the Invention

The present invention relates to a high-performance carry lookahead adder (CLA) using an NMOS logic circuit.

2. Description of the Related Art

A microprocessor unit (MPU) is the core component used in personal computers, workstations, and various controller boards, and controls the function of a system by performing software. The core executing component of the MPU or microcontroller unit (MCU) is an arithmetic logic unit (ALU) for executing arithmetic operations, and the representative functional device of the ALU is an adder. Accordingly, implementation of a high-speed adder forms the basis of the construction of a high-speed MPU. The present invention is also applied to custom semiconductor integrated circuits having the MCU or ALU function.

Figure 1:
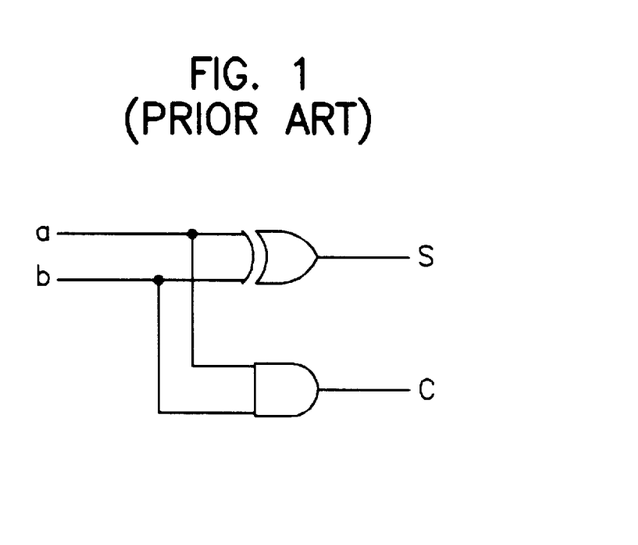
FIG. 1 is a schematic circuit diagram of a typical half adder.
Figure 2:
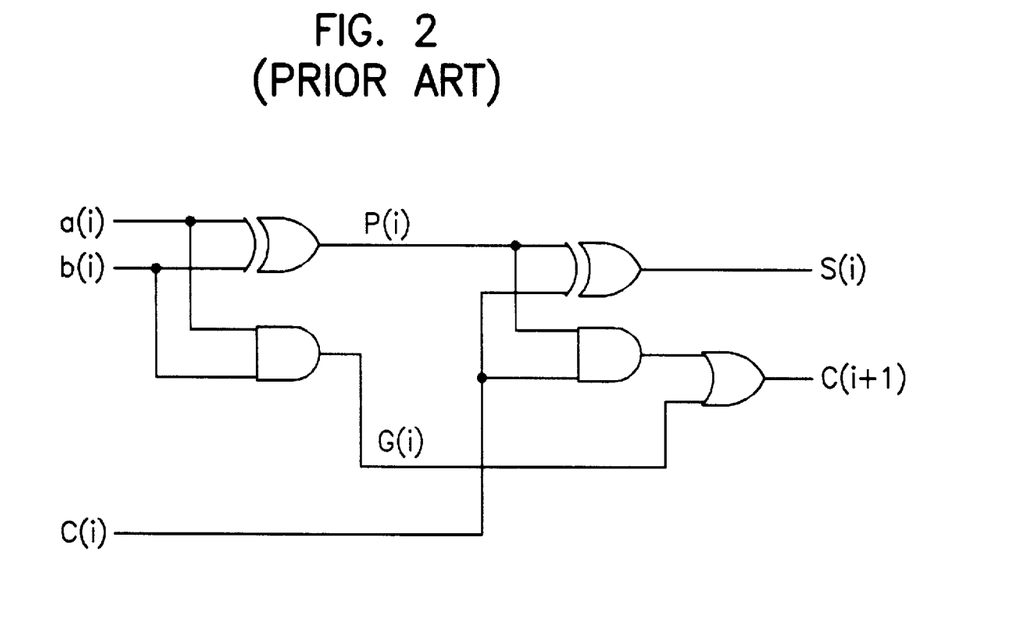
FIG. 2 is a schematic circuit diagram of a typical full adder.

First, the construction of a typical adder is explained. A half adder for performing a binary addition of data a and data b is illustrated in FIG. 1, whose functions are represented as $S(sum) = a \oplus b$, $C(carry) = a \cdot b$ (Hereinafter, the added sum is referred to as "S", and the carry is referred to as "C".). FIG. 2 illustrates the construction of a full adder which can execute operations of carry inputs, and whose functions are represented as if $P(i) = a(i) \oplus b(i)$, $G(i) = a(i) \cdot b(i)$, then $S(i) = P(i) \oplus C(i)$, and $C(i+1) = G(i) + P(i) \cdot C(i)$.

Figure 3:
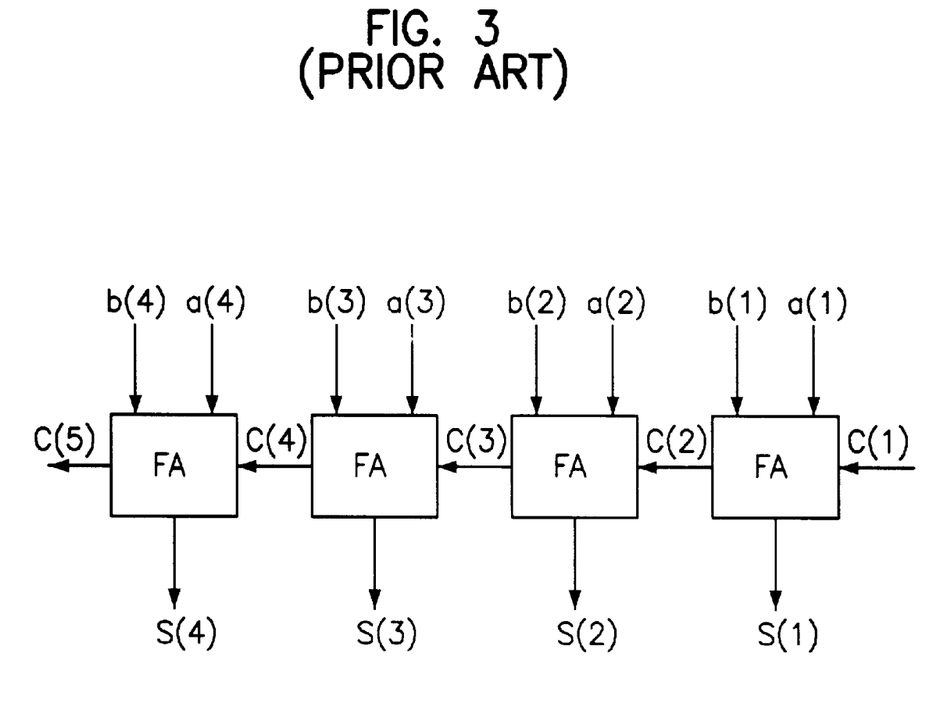
FIG. 3 is a block diagram of a typical 4-bit full adder.

FIG. 3 illustrates the construction of a 4-bit full adder which is composed of 4 full adder blocks. If the delay of a full adder is Δ, S(1), S(2), S(3), and S(4) have the delays of 1Δ, 2Δ, 3Δ, and 4Δ, respectively, resulting in that C(5) has the delay of 4Δ. Accordingly, if a 32-bit adder is constructed using the above full adders, it has the delay of 32Δ, and this causes the implementation of a high-speed adder to be impossible.

In order to solve this problem, a carry lookahead type adder has been developed, whereby an exclusive-OR value P(i) and a logic product value G(i) are produced from 3-bit data a[3:0] and b[3:0], and then the sum S(i) and the carry C(i) are produced by logically combining P(i) and G(i). The carry C(i) is given as:

$$C(2) = G(1) + P(1) \cdot C(1)$$

$$C(3) = G(2) + P(2) \cdot C(2) = G(2) + P(2) \cdot G(1) + P(2) \cdot P(1) \cdot C(1)$$

$$C(4) = G(3) + P(3) \cdot G(2) + P(3) \cdot P(2) \cdot G(1) + P(3) \cdot P(2) \cdot P(1) \cdot C(1)$$

$$C(5) = G(4) + P(4) \cdot G(3) + P(4) \cdot P(3) \cdot G(2) + P(4) \cdot P(3) \cdot P(2) \cdot G(1) + P(4) \cdot P(3) \cdot P(2) \cdot P(1) \cdot C(1).$$

Figure 4:
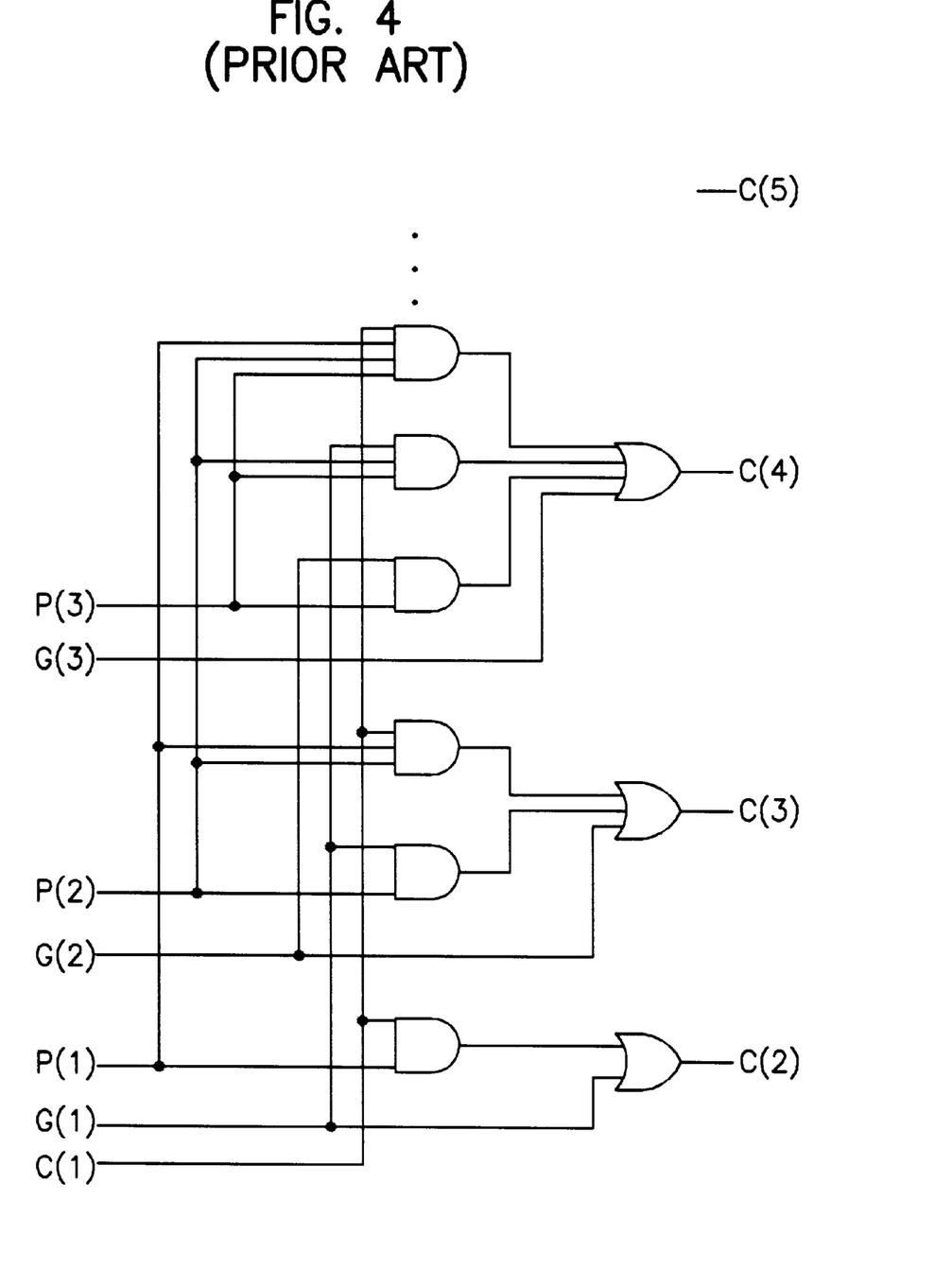
FIG. 4 is a logical circuit diagram illustrating the carry generator employed in a carry lookahead adder.

The above equations can be effected by a logic circuit of FIG. 4. Referring to the circuit of FIG. 4, the 4-bit full adder, which accompanied the delay of 4Δ, has been improved into a circuit capable of obtaining the same result through several logics.

However, the conventional logic circuit has the disadvantage that a carry generator used therein is constructed by CMOS logics using basic gates, and thus it produces a large amount of delay. As a result, the conventional logic circuit has a speed faster than that of the full adder, but it is still unsuitable for achieving a high-speed operation of several hundred MHz.

SUMMARY OF THE INVENTION

It is an object of the present invention to provide a high-performance carry lookahead adder (CLA) which can reduce the delay time of the whole adder by constructing a carry generator used therein with NMOS logics, thereby enabling a high-speed operation of a processor.

It is another object of the present invention to provide a carry lookahead adder which can effect a low power-consumption by reducing a static current flowing therethrough along with its high-speed operation.

Generally, an NMOS circuit is more advantageous than a CMOS circuit in operating speed, but it has disadvantageous characteristics in current consumption, noise margin, etc. However, since the speed of the whole MPU can be increased if NMOS logics are used in a unit where a high-speed operation is required, such as the arithmetic logic unit (ALU), a carry generating circuit employing such NMOS logics is used for constructing a 4-bit CLA. Also, the NMOS logics are used in constructing a high-performance ALU employing a 64-bit or 32-bit CLA circuit, and the CMOS logics are constructed as composite circuits, being not constructed with basic gates, resulting in the increase of the operating speed.

In one aspect of the present invention, there is provided a carry lookahead adder having a carry generator for receiving an exclusive-OR value P(i, i=1,2,3,4) and a logic product value G(i) of two data having predetermined bits, and an initial carry value C(1), and performing a function of $G(4) + P(4) \cdot G(3) + P(4) \cdot P(3) \cdot G(2) + P(4) \cdot P(3) \cdot P(2) \cdot G(1) + P(4) \cdot P(3) \cdot P(2) \cdot P(1) \cdot C(1)$ to output a final carry value C(5), the carry generator for outputting the final carry value C(5) comprising:

a first NMOS transistor, connected between G(3) and a ground level, for receiving P(4) through its gate to execute an operation of P(4)·G(3);

second and third NMOS transistors, connected in parallel between G(2) and the ground level, for receiving P(3) and P(4) through their gates, respectively, to execute an operation of P(4)·P(3)·G(2);

fourth, fifth, and sixth NMOS transistors, connected in parallel between G(1) and the ground level, for receiving P(2), P(3), and P(4) through their gates, respectively, to execute an operation of P(4)·P(3)·P(2)·G(1);

seventh, eighth, and ninth NMOS transistors, connected in parallel between P(1) and the ground level, for receiving P(2), P(3), and P(4) through their gates, respectively, to execute an operation of P(4)·P(3)·P(2)·P(1)·C(1), and tenth and eleventh NMOS transistors, connected in series between G(4) and the ground level, for receiving C(1) and P(1) through their gates, respectively; and twelfth, thirteenth, and fourteenth NMOS transistors, connected in parallel between G(4) and the ground level, for receiving G(1), G(2) and G(3) through their gates, respectively, to output C(5) by an OR operation of the respective logic product terms.

In another aspect of the present invention, there is provided a carry lookahead adder having a carry generator for receiving an exclusive-OR value P(i, i=1, 2, 3) and a logic product value G(i, i=1, 2, 3) of two data having predetermined bits, and an input carry value C(1), and performing a function of $G(3) + P(3) \cdot G(2) + P(3) \cdot P(2) \cdot G(1) + P(3) \cdot P(2) \cdot P(1) \cdot C(1)$ to output a following bit carry value C(4) of a most significant bit carry, the carry generator for outputting the carry value C(4) comprising:

a first NMOs transistor, connected between G(2) and a ground level, for receiving P(3) through its gate to execute an operation of P(3)·G(2);

second and third NMOS transistors, connected in parallel between G(1) and the ground level, for receiving P(2) and P(3) through their gates, respectively, to execute an operation of P(3)·P(2)·G(1);

fourth and fifth NMOS transistors, connected in parallel between P(1) and the ground level, for receiving P(2) and P(3) through their gates, respectively, to execute an operation of P(3)·P(2)·P(1)·C(1), and sixth and seventh NMOS transistors, connected in series between G(3) and the ground level, for receiving C(1) and P(1) through their gates, respectively; and eighth and ninth NMOS transistors, connected in parallel between G(3) and the ground level, for receiving G(1) and G(2) through their gates, respectively, to output C(4) by an OR operation of the respective logic product terms.

BRIEF DESCRIPTION OF THE DRAWINGS

The above objects, other features, and advantages of the present invention will become more apparent by describing the preferred embodiments thereof with reference to the accompanying drawings, in which.

DETAILED DESCRIPTION OF THE PREFERRED EMBODIMENTS

The embodiments of the present invention will be explained in detail with reference to FIGS. 5 to 10.

Figure 5:
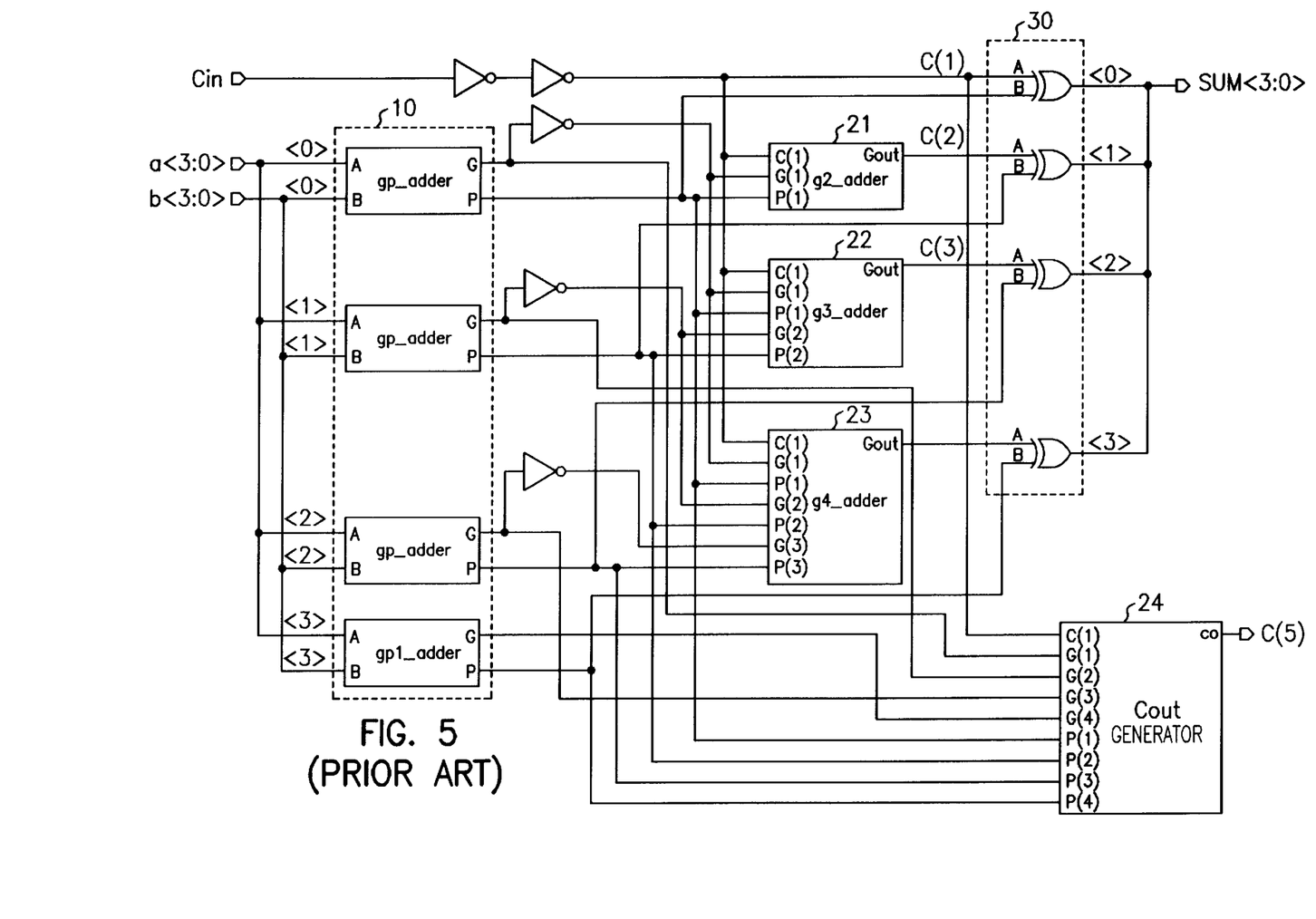
FIG. 5 is a schematic circuit diagram of a typical 4-bit carry lookahead adder.

FIG. 5 is a block diagram illustrating the construction of a typical 4-bit carry lookahead adder (CLA).

Referring to FIG. 5, respective gp-adders 10 receive data a[3:0] and b[3:0], and generate exclusive-OR terms P(i) and logic product terms G(i), respectively. Carry generators, i.e., g2-adder 21, g3-adder 22, g4-adder 23, and Cout generator, generate carry outputs C(2), C(3), C(4), and C(5), respectively. An exclusive-OR (XOR) gate 30 generates a SUM [3:0].

The g2-adder 21 and the g3-adder 22 for generating C(2) and C(3), respectively, among the carry generators may be constructed with composite CMOS logics to improve their operating speed. However, if the g4-adder 23 and the Cout generator 24 for generating C(4) and C(5), respectively, are constructed with the same composite CMOS logics, the amount of delay becomes greater than that of a circuit employing simple basic gates due to the serial delay of the NMOS logics and the serial delay of the PMOS logics.

At this time, since the delays of the terms SUM[3:0] are increased in the order of SUM[3], SUM[2], SUM[1], and SUM[0], the term SUM[3] corresponds to the critical path. In case of a 32-bit adder, the carry output C(5) will correspond to the utmost critical path.

According to the present invention, NMOS logics are employed in the g4-adder 23 and the Cout generator 24 for generating C(4) and C(5), respectively, and thus the delay of the whole critical path of the adder is reduced, resulting in the improvement of the whole operating speed.

Specifically, the g2-adder 21 and the g3-adder 22 among the carry generators are constructed with composite CMOS logics, while the g4-adder 23 and the Cout generator 24 are constructed with the NMOS logics.

Figure 6:
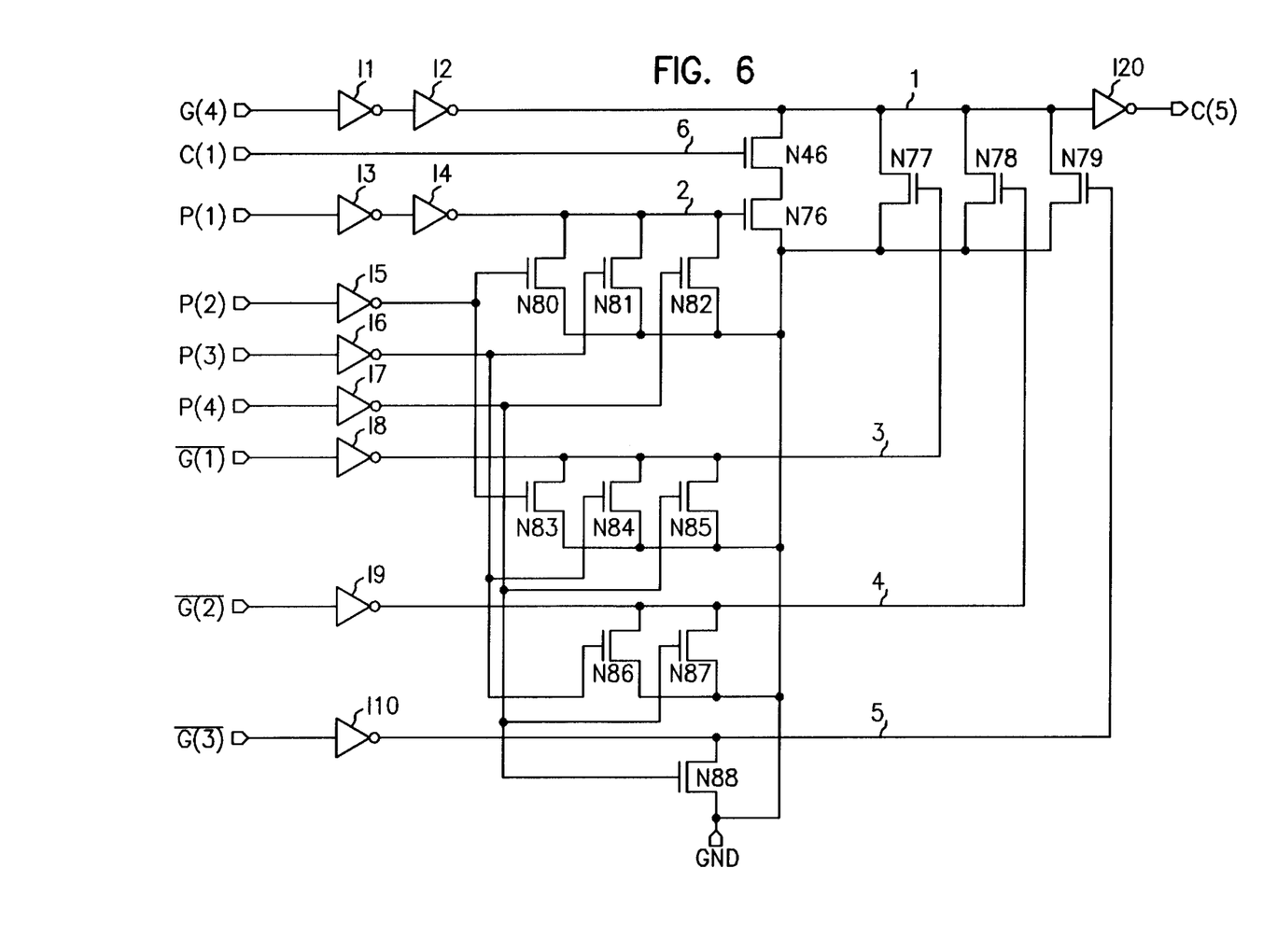
FIG. 6 is a schematic circuit diagram of the Cout generator of FIG. 5 according to an embodiment of the present invention.

FIG. 6 is a schematic circuit diagram of the Cout generator 24 for generating the final carry C(5). The Cout generator 24 performs a function of C(5)=G(4)+P(4)·G(3)+P(4)·P(3)·G(2)+P(4)·P(3)·P(2)·G(1)+P(4)·P(3)·P(2)·P(1)·C(1).

Referring to FIG. 6, the Cout generator 24 includes an NMOS transistor N88, connected between G(3) and a ground level line GND, for receiving P(4) through its gate to execute an operation of P(4)·G(3), NMOS transistors N86 and N87, connected in parallel between G(2) and the ground level line GND, for receiving P(3) and P(4) through their gates, respectively, to execute an operation of P(4)·P(3)·G(2), and NMOS transistors N83, N84, and N85, connected in parallel between G(1) and the ground level line GND, for receiving P(2), P(3), and P(4) through their gates, respectively, to execute an operation of P(4)·P(3)·P(2)·G(1). The operation of P(4)·P(3)·P(2)·P(1)·C(1) is performed by NMOS transistors N80, N81, and N82, connected in parallel between P(1) and the ground level line GND, for receiving P(2), P(3), and P(4) through their gates, respectively, and NMOS transistors N46 and N76, connected in series between G(4) and the ground level line GND, for receiving C(1) and P(1) through their gates, respectively. The detailed explanation of the NMOS transistor 46 will follow hereinafter.

If the respective logic product terms are generated as described above, an OR operation of the product terms and G(4) should be performed to output C(5). This OR operation is performed by the NMOS transistors N46 and N76, N77, N78, and N79, which are connected in parallel between G(4) and the ground level line GND, for receiving C(1), P(1), G(1), G(2), and G(3) through their gates, respectively. The NMOS transistor N46 is connected to the NMOS transistor N76 in series, so that the NMOS transistor N46 is firstly turned on by C(1) which is inputted most rapidly to achieve the high-speed operation.

The operation of the carry generator as constructed above will now be explained.

The respective product terms are applied to the respective gates of the NMOS transistors N77, N78, N79, N76, and N46. If any one of the product terms has a logic level "1", the G(4) input signal goes to a logic level "0", and the final carry signal C(5) has an inverted logic value of a node ①. That is, the logic value on the node ① is inverted by an inverter I20 to be sensed as the final carry signal C(S). The role of the respective elements are as follows:

The NMOS transistors N46 and N76 connected in series are used for generating the term of P(4)·P(3)·P(2)·P(1)·C(1). Nodes ⑥ and ②, which are input terminals of the NMOS transistors N46 and N76, generates C(1) and P(4)·P(3)·P(2)·P(1). The node ② becomes "1" when all of P(1), P(2), P(3), and P(4) are "1". The node ① becomes "0" when both the node ⑥ and node ② are "1", while it will be a 'Don't Care' term otherwise.

A node ③ becomes "1" when all of P(4), P(3), P(2), and G(1) are "1". Thus, the node ① becomes "0" when the node ③ is "1", while it will be a 'Don't Care' term otherwise.

A node ④ becomes "1" when all of P(4), P(3), and G(2) are "1". Thus, the node ① becomes "0" when the node ④ is "1", while it will be a 'Don't Care' term otherwise.

A node ⑤ becomes "1" when both P(4) and G(3) are "1". Thus, the node ① becomes "0" when the node ⑤ is "1", while it will be a 'Don't Care' term otherwise.

As a result, the function of C(5)=G(4)+P(4)·G(3)+P(4)·P(3)·G(2)+P(4)·P(3)·P(2)·G(1)+P(4)·P(3)·P(2)·P(1)·C(1) can be performed to output the final carry signal Cout.

Here, the logic levels of "1" and "0" do not actually represent a supply voltage Vdd and the ground voltage GND. The voltage on the node ① varies analogically due to the current paths formed by the PMOS inverter which follows the node ① and the NMOS transistors N77, N78, N79, N49, and N76. The same explanation can be applied to the nodes ②, ③, ④, and ⑤.

The above-described circuit generally represents a simulation result that the operating speed thereof is faster than that of the conventional CMOS circuit in a similar manner as the precharged NMOS logic circuit.

Figure 7:
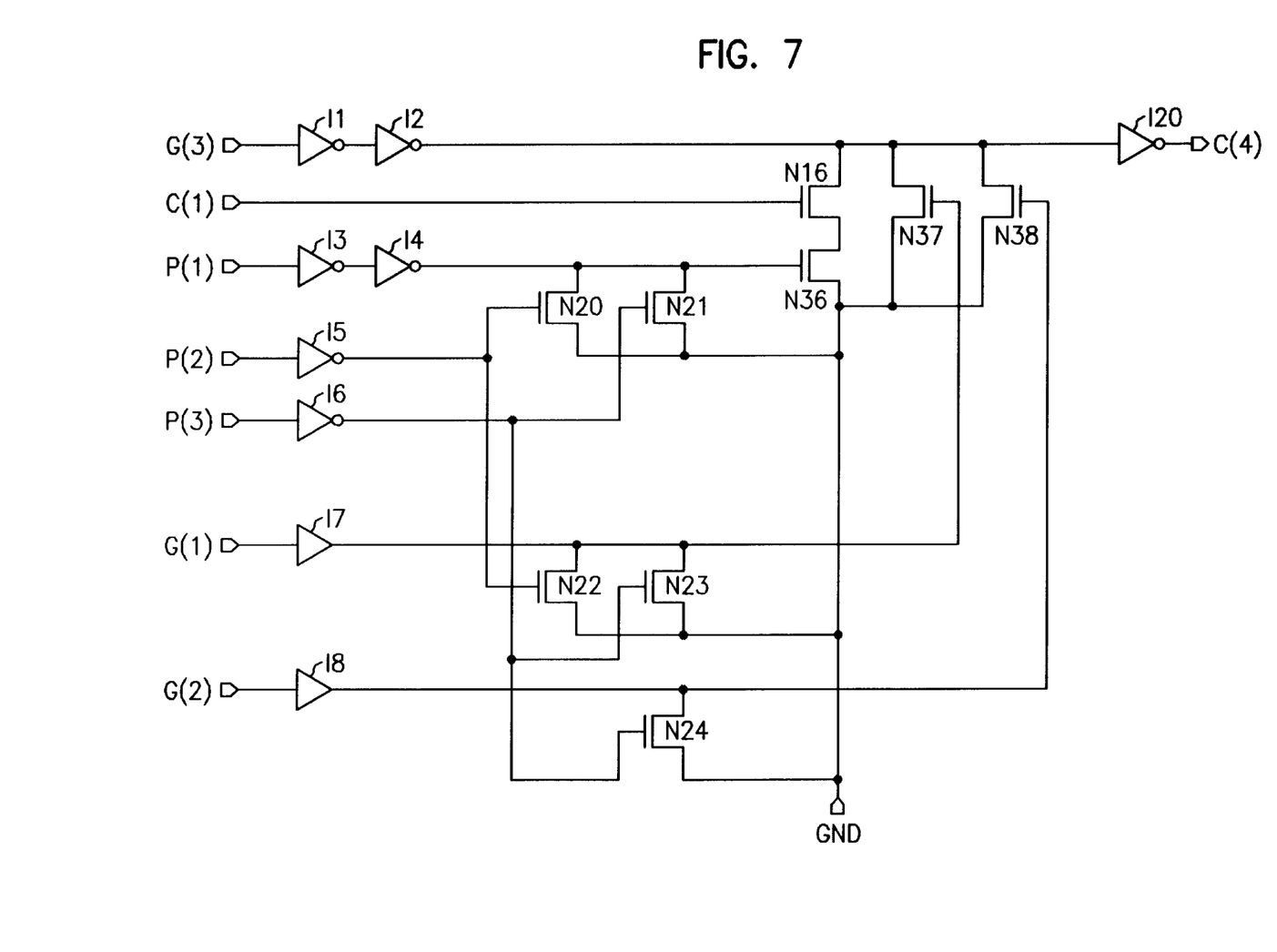
FIG. 7 is a schematic circuit diagram of the g4-adder of FIG. 5 according to an embodiment of the present invention.

FIG. 7 is a schematic circuit diagram of the g4-adder 23 for outputting the bit carry signal C(4) following the most significant bit carry signal. The g4-adder 23 performs a function of C(4)=G(3)+P(3)·G(2)+P(3)·P(2)·G(1)+P(3)·P(2)·P(1)·C(1).

Referring to FIG. 7, the g4-adder 23 includes an NMOS transistor N24, connected between G(2) and the ground level GND, for receiving P(3) through its gate to execute an operation of P(3)·G(2), NMOS transistors N22 and N23, connected in parallel between G(1) and the ground level GND, for receiving P(2) and P(3) through their gates, respectively, to execute an operation of P(3)·P(2)·G(1), NMOS transistors N20 and N21, connected in parallel between P(1) and the ground level, for receiving P(2) and P(3) through their gates, respectively, to execute an operation of P(3)·P(2)·P(1)·C(1), and NMOS transistors N16 and N36, connected in series between G(3) and the ground level, for receiving C(1) and P(1) through their gates, respectively.

If the respective logic product terms are generated, an OR operation of the product terms and G(3) should be performed to output C(4). This OR operation is performed by the NMOS transistors N16 and N36, N37, and N38, connected in parallel between G(3) and the ground level, for receiving C(1), P(1), G(1), and G(2) through their gates, respectively. An inverter I20 connected to the output terminal of the carry signal C(4) inverts the carry signal C(3) to sense the inverted value of the carry signal C(4).

The operation of the g4-adder 23 as constructed above is similar to that of the circuit of FIG. 6, and thus the detailed explanation thereof will be omitted.

Figure 8:
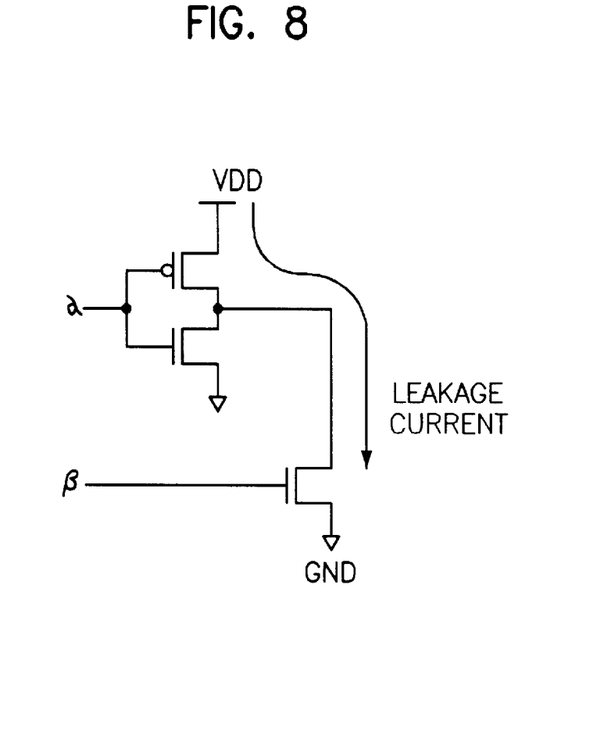
FIG. 8 is a conceptional view explaining the leakage current problem caused by the circuit of FIG. 6.

However, according to this circuit, a static current loss is produced in the event that G4="1", P1="1", G1="0", G2="0", G3="0", and C1="1", P2="0", P3="0", P4="0". Specifically, as shown in FIG. 8, by making α=0, and β=1, the condition that current flows constantly from the supply voltage line Vdd to the ground voltage line GND is imposed.

Figure 9:
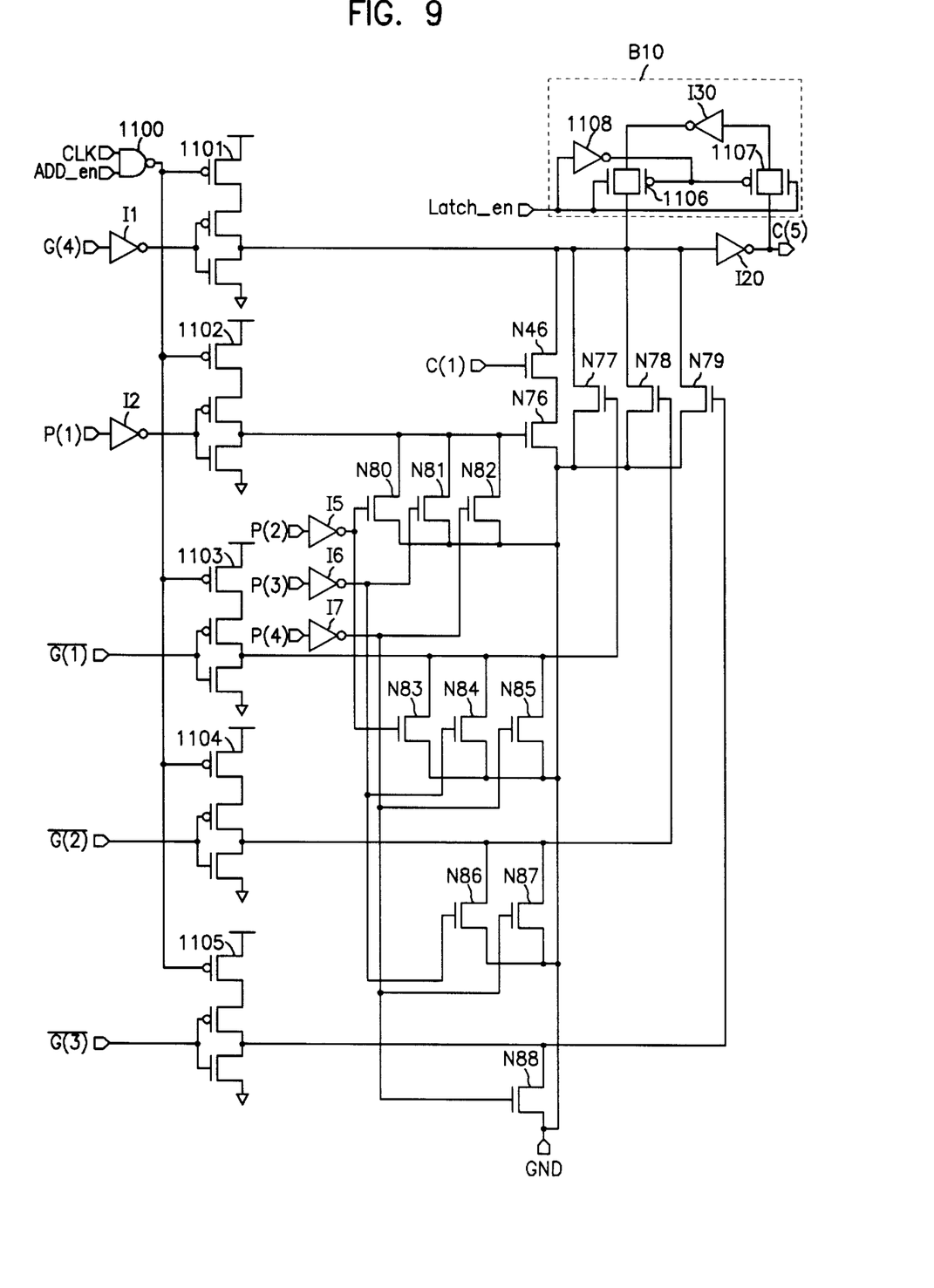
FIG. 9 is a schematic circuit diagram of the Cout generator of FIG. 5 according to another embodiment of the present invention.

FIG. 9 is a schematic circuit diagram of the Cout generator which is proposed to prevent the above-described static current loss according to another embodiment of the present invention.

According to the Cout generator of FIG. 9, a NAND gate 1100 for NAND-gating a clock signal and an adder enable signal, and CMOS inverters which substitute the input-stage inverters I2, I4, I5 to I10 of FIG. 6 are constructed. Additionally, PMOS transistors 1101 to 1105, connected between the supply voltage and pull-up PMOS transistors, for receiving the output of the NAND gate 1100 are constructed. Also, on the output terminal of the Cout generator is additionally constructed a bus keeper B10 including an inverter I30, which latches the output terminal along with the inverter I20 in accordance with a latch enable signal Lach_en, to heighten the driving force of the bus. The bus keeper B10 comprises a transmission gates 1106 and 1107 for receiving the latch enable signal Lach_en through their gates, and the inverter I30 coupled to the input and output terminals of the inverter I20 through the transmission gates 1106 and 1107.

Figure 10:
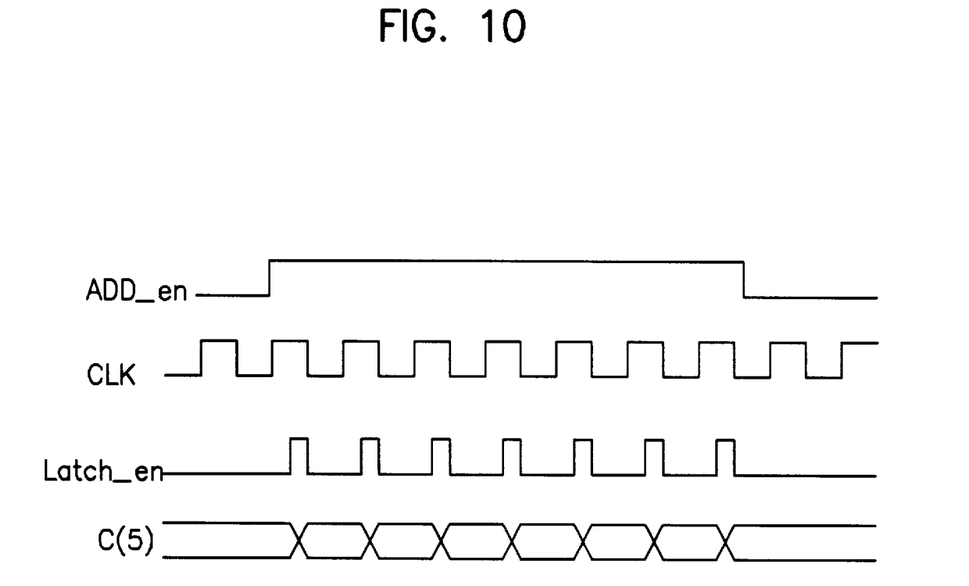
FIG. 10 is a timing diagram illustrating respective control signals and a carry output signal appearing at various points of FIG. 9.

FIG. 10 is a timing diagram illustrating the respective control signals, i.e., the clock signal CLK, the adder enable signal ADD_en, the latch enable signal Lach_en, and the final carry signal C(5).

The additionally constructed PMOS transistors 1101, 1102, 1103, 1104, and 1105 in FIG. 9 are controlled by the clock signal and the adder enable signal ADD_en. When both the clock signal and the adder enable signal become 'high', the PMOS transistors are turned on and provide the supply voltage to the CMOS inverters, thereby solving the above-described leakage current problem. Also, the transmission gates 1106 and 1107 are turned on only when the latch enable signal Lach_en becomes 'high', and at this time, the final carry signal C(5) is outputted.

The carry generating circuit of FIG. 9 generates the carry signal at the same operating speed as the carry generating circuit of FIG. 6, but reduces its power consumption by ½ in comparison with the circuit of FIG. 6. Since in an idle state, the DC current flowing through the carry generating circuit of FIG. 9 becomes almost zero, the carry generating circuit can be efficiently used in the chip such as a CPU which consumes much power.

The circuit for generating the carry signal C(4) which follows the most significant bit carry as shown in FIG. 7 can also employ the PMOS transistors which are connected to the input-stage inverters and are controlled by the NOR gates, and the latches which are connected to the output terminal of the circuit, to achieve a low power-consumption.

As described above, according to the present invention, the carry generators having the largest delay time in performing 4-bit addition are implemented using NMOS logics, and thus a high-speed operation of the adder can be obtained. Further, by adding a dynamic circuit, a static current flowing through the adder is reduced to effect a low power-consumption. Furthermore, implementation of a high-speed ALU becomes possible by applying the present invention to a 32-bit or 64-bit carry lookahead adder.

While the present invention has been described and illustrated herein with reference to the preferred embodiments thereof, it will be understood by those skilled in the art that various changes in form and details may be made therein without departing from the spirit and scope of the invention.

What is claimed is:

1. A carry lookahead adder having a carry generator for receiving an exclusive-OR value P(i,i=1,2,3,4) and a logic product value G(i) of two data having predetermined bits, and an initial carry value C(1), and performing a function of G(4) +b(4)·G(3)+P(4)·P(3)·G(2)+P(4)·P(3)·P(2)·G(1)+P(4)·P(3)·P(2)·P(1)·C(1) to output a final carry value C(5), the carry generator for outputting the final carry value C(5) comprising:

a first NMOS transistor, connected between G(3) and a ground level, for receiving P(4) through its gate to execute an operation of P(4)·G(3);

second and third NMOS transistors, connected in parallel between G(2) and the ground level, for receiving P(3) and P(4) through their gates, respectively, to execute an operation of P(4)·P(3)·G(2);

fourth, fifth, and sixth NMOS transistors, connected in parallel between G(1) and the ground level, for receiving P(2), P(3), and P(4) through their gates, respectively, to execute an operation of P(4)·P(3)·P(2)·G(1);

seventh, eighth, and ninth NMOS transistors, connected in parallel between P(1) and the ground level, for receiving P(2), P(3), and P(4) through their gates, respectively, to execute an operation of P(4)·P(3)·P(2)·P(1)·C(1), and tenth and eleventh NMOS transistors, connected in series between G(4) and the ground level, for receiving C(1) and P(1) through their gates, respectively; and twelfth, thirteenth, and fourteenth NMOS transistors, connected in parallel between G(4) and the ground level, for receiving G(1), G(2) and G(3) through their gates, respectively, to output C(5) by an OR operation of the respective logic product terms.

2. A carry lookahead adder as claimed in claim 1, wherein the carry generator for outputting the final carry value C(5) further comprises inverter means, connected to each input terminal of C(1), G(1), G(2), G(3), G(4), P(1), P(2), P(3), and P(4), for buffering an input signal thereof.

3. A carry lookahead adder as claimed in claim 2, wherein the inverter means comprises a CMOS inverter, and a PMOS transistor, connected in series between a PMOS transistor which constitute the CMOS inverter and the supply voltage line, for being controlled by combination of a clock signal and an adder enable signal.

4. A carry lookahead adder as claimed in claim 3, wherein the inverter means further comprises a NAND gate for NAND-gating the clock signal and the adder enable signal.

5. A carry lookahead adder as claimed in claim 1, wherein the carry generator for outputting the final carry value C(5) further comprises latch means, connected to an output terminal of the carry generator, for receiving a latch enable signal, and sensing and latching the output terminal.

6. A carry lookahead adder having a carry generator for receiving an exclusive-OR value P(i, i=1, 2, 3) and a logic product value G(i, i=1, 2, 3) of two data having predetermined bits, and an input carry value C(1), and performing a function of G(3)+P(3)·G(2)+P(3)·P(2)·G(1)+P(3)·P(2)·P(1)·C(1) to output a following bit carry value C(4) of a most significant bit carry, the carry generator for outputting the carry value C(4) comprising:

a first NMOs transistor, connected between G(2) and a ground level, for receiving P(3) through its gate to execute an operation of P(3)·G(2);

second and third NMOS transistors, connected in parallel between G(1) and the ground level, for receiving P(2) and P(3) through their gates, respectively, to execute an operation of P(3)·P(2)·G(1);

fourth and fifth NMOS transistors, connected in parallel between P(1) and the ground level, for receiving P(2) and P(3) through their gates, respectively, to execute an operation of P(3)·P(2)·P(1)·C(1), and sixth and seventh NMOS transistors, connected in series between G(3) and the ground level, for receiving C(1) and P(1) through their gates, respectively; and eighth and ninth NMOS transistors, connected in parallel between G(3) and the ground level, for receiving G(1) and G(2) through their gates, respectively, to output C(4) by an OR operation of the respective logic product terms.

7. A carry lookahead adder as claimed in claim 6, wherein the carry generator for outputting the carry value C(4) further comprises inverter means, connected to each input terminal of C(1), G(1), G(2), G(3), P(1), P(2), and P(3), for buffering an input signal thereof.

8. A carry lookahead adder as claimed in claim 7, wherein the inverter means comprises a CMOS inverter, and a PMOS transistor, connected in series between a PMOS transistor which constitute the CMOS inverter and the supply voltage line, for being controlled by combination of a clock signal and an adder enable signal.

9. A carry lookahead adder as claimed in claim 8, wherein the inverter means further comprises a NAND gate for NAND-gating the clock signal and the adder enable signal.

10. A carry lookahead adder as claimed in claim 6, wherein the carry generator for outputting the final carry value C(5) further comprises latch means, connected to an output terminal of the carry generator, for receiving a latch enable signal, and sensing and latching the output terminal.

* * * * *